United States Patent
Nakata et al.

(10) Patent No.: US 6,753,077 B2
(45) Date of Patent: Jun. 22, 2004

(54) MAGNETIC RECORDING MEDIUM AND PROCESS FOR PRODUCING THE SAME

(75) Inventors: Kenichi Nakata, Ohtake (JP); Kousaku Tamari, Hiroshima (JP); Jun Koujima, Hiroshima-ken (JP); Teruaki Santoki, Ohtake (JP)

(73) Assignee: Toda Kogyo Corporation, Hiroshima-ken (JP)

(*) Notice: Subject to any disclaimer, the term of this patent is extended or adjusted under 35 U.S.C. 154(b) by 50 days.

(21) Appl. No.: 09/741,890

(22) Filed: Dec. 22, 2000

(65) Prior Publication Data

US 2002/0094458 A1 Jul. 18, 2002

(30) Foreign Application Priority Data

Dec. 27, 1999 (JP) .......................................... 11-371435

(51) Int. Cl.[7] .......................... G11B 5/62; H01F 10/12; H01F 10/14
(52) U.S. Cl. ................... 428/332; 428/336; 428/694 T; 428/694 TR; 428/694 TS
(58) Field of Search ................................ 428/332, 336, 428/694 T, 694 TR, 694 TS

(56) References Cited

U.S. PATENT DOCUMENTS

| 4,642,245 A | * 2/1987 | Ishii et al. ..................... 427/47 |
| 5,080,948 A | * 1/1992 | Morita et al. ............... 508/948 |
| 5,750,230 A | 5/1998 | Ishikawa et al. |
| 6,057,021 A | * 5/2000 | Ishikawa et al. ........... 428/65.3 |

FOREIGN PATENT DOCUMENTS

| EP | 0 673 021 A1 | 9/1995 |
| EP | 0 091 068 A1 | 4/1999 |
| EP | 0 097 162 A1 | 4/1999 |
| EP | 0 945 858 A1 | 9/1999 |

* cited by examiner

*Primary Examiner*—Nikolas J. Uhlir
(74) *Attorney, Agent, or Firm*—Nixon & Vanderhye P.C.

(57) ABSTRACT

A magnetic recording medium including a substrate and formed on the substrate a maghemite thin film having a surface roughness represented by a center line mean roughness Ra of 0.1 to 1.0 nm, and a coercive force squareness S* value of not less than 0.50. This magnetic recording medium exhibits excellent magnetic properties, especially, coercive force squareness S* value and a more enhanced surface smoothness.

7 Claims, 1 Drawing Sheet

MAGNETIC RECORDING MEDIUM AND PROCESS FOR PRODUCING THE SAME

BACKGROUND OF THE INVENTION

The present invention relates to a magnetic recording medium and a process for producing the magnetic recording medium, and more particularly, to a magnetic recording medium comprising a maghemite thin film, which exhibits excellent magnetic properties, especially, coercive force squareness S* value and a more enhanced surface smoothness, and a process for producing the magnetic recording medium comprising such a maghemite thin film by a sputtering method.

In recent years, in magnetic recording apparatuses such as hard disk devices, there has been a remarkable tendency that information devices or systems used therefor are miniaturized and required to have a high reliability. With such a recent tendency, in order to deal with a large capacity data, there is an increasing demand for providing magnetic recording media on which information can be stored with a high density.

In order to satisfy such requirements, the magnetic recording media have been strongly required to not only have a large coercive force, but also reduce a distance between a magnetic head and a magnetic recording layer (magnetic spacing).

As magnetic recording media having a large coercive force, there is widely known those comprising a substrate and a magnetic thin film formed on the substrate.

The magnetic thin films which have been already put into practice, are generally classified into magnetic oxide thin films composed of maghemite, etc. (refer to "Technical Report of Electronic Telecommunication Institute", published by Electronic Telecommunication Institute, (1981) MR81-20, pp. 5 to 12; "Ceramics", published by Japan Institute of Ceramics, (1986) Vol. 24, No. 1, pp. 21 to 24, and Japanese Patent Publication (KOKOKU) Nos. 51-4086 (1976) and 5-63925(1993)); and magnetic alloy thin films composed of Co-Cr alloy or the like.

The magnetic oxide thin films are excellent in oxidation resistance or corrosion resistance due to inherent properties of the oxides. Therefore, the magnetic oxide thin films can show an excellent stability independent of change in passage of time, and less change in magnetic properties with passage of time. Further, since oxides exhibit a higher hardness than that of metals, no protective film is required, so that the magnetic spacing of magnetic recording media comprising such a magnetic oxide thin film can be reduced as compared to that of magnetic recording media comprising the magnetic alloy thin film composed of Co-Cr or the like. Therefore, the magnetic oxide thin film is suitable for the production of high-density magnetic recording media.

In view of the above, it has been attempted to enhance a coercive force of the maghemite thin film as one of magnetic oxide films, by using magnetite particles in which cobalt is incorporated therein. However, with the increase in cobalt content, the maghemite thin film tends to be deteriorated in stability independent of change in passage of time due to adverse influences of heat or the like.

Meanwhile, the present inventors have already proposed the invention relating to the maghemite thin film which can exhibits a high coercive force even with a less cobalt content by controlling the spacing of specific plane of maghemite (Japanese Patent Application Laid-Open (KOKAI) Nos. 11-110731(1999) and 11-110732(1999)).

On the other hand, the magnetic alloy thin films have a coercive force as high as not less than about 159 kA/m (2,000 Oe). However, these magnetic alloy thin films are readily oxidized in themselves and, therefore, tend to be deteriorated in stability independent of change in passage of time as well as magnetic properties.

In order to prevent the deterioration of magnetic properties due to the oxidation, a protective film of diamond-like carbon, $SiO_2$ or the like having a thickness of usually about 5 to 10 nm, is formed on the surface of the magnetic alloy thin film, thereby causing the increase in magnetic spacing corresponding to the thickness of the protective film.

In magnetic recording media, in order to reduce the magnetic spacing, it is necessary to reduce the flying height of magnetic head to as low a level as possible, and always cause the magnetic head to be flying stably. In conventional hard disk drive devices, magnetic recording media used therefor have been required to have some surface roughness in order to prevent the magnetic head from being fixed onto the magnetic recording media due to a meniscus force therebetween upon stopping the magnetic head. At the present time, due to the improvement in hard disc systems, magnetic recording media have been no longer required to show such a surface roughness for preventing the magnetic head from being fixed thereonto. However, it has been required that magnetic thin films used in these magnetic recording media have a more excellent surface smoothness.

Also, it is known that the non-smooth surface of magnetic recording media causes media noise. In order to eliminate such a media noise, it is necessary to reduce a surface roughness of the magnetic thin film.

At present, in magnetic recording media using a magnetic oxide thin film, the surface properties of the magnetic thin film largely depend upon those of a substrate because the thickness of the magnetic oxide thin film is as extremely small as not more than 50 nm. Therefore, it has been required not only to use such a substrate having an excellent surface smoothness, but also to develop techniques for further smoothening the surface of magnetic thin film.

Hitherto, as methods of producing maghemite thin films, there are known (1) a method comprising forming a hematite thin film on a substrate, reducing the hematite thin film at a temperature of 230 to 320° C. to transform the hematite thin film into a magnetite thin film, and then oxidizing the magnetite thin film at a temperature of 290 to 330° C. to transform the magnetite thin film into a maghemite thin film; (2) a method comprising forming a magnetite thin film on a substrate and oxidizing the magnetite then film at a temperature of not less than 320° C. to transform the magnetite thin film into a maghemite thin film; (3) a method comprising forming a cobalt-containing maghemite thin film directly on a substrate by decomposing vapors of metal chelate, metal carbonyl or ferrocenes containing iron and $M_X$ (wherein M represents at least one element selected from the group consisting of Co, Cu, Rh, Ru, Os, Ti, V and Nb; and X is 0.01 to 0.1) and an oxygen gas in a high-density pressure-reduced plasma by applying a magnetic field thereto (Japanese Patent Application Laid-Open (KOKAI) No. 3-78114 (1991)); or the like.

Presently, it has been strongly demanded to provide magnetic recording media having a maghemite thin film capable of showing excellent magnetic properties, especially coercive force squareness S* and an excellent surface smoothness while maintaining a high coercive force. However, such magnetic recording media satisfying these requirements have not been obtained until now.

Namely, in the above magnetite production methods (1) and (2), the obtained magnetize thin film is taken out into atmosphere, and further subjected to oxidation treatment at a temperature of 280 to 450° C. under the atmosphere, thereby obtaining the maghemite thin film. However, since it is necessary to conduct the heat treatment at a temperature as high as not less than 280° C., there arises such a problem that the obtained thin film is deteriorated in magnetic properties due to migration from the substrate. Therefore, it is required to select materials of the substrate from those having an excellent heat resistance, so that substrates usable therefor are limited. In addition, since the magnetite thin film is taken out in atmosphere, there also arise problems such as contamination thereof.

On the other hand, in the method (3) of producing the cobalt-containing maghemite thin film, since the maghemite thin film is formed at a substrate temperature as low as about 50° C., it is possible to use plastic substrates made of polyesters, polystyrene terephthalate, polyamides or the like having a less heat resistance. However, the obtained magnetic recording media have a very low coercive force, i.e., about 135 kA/m (1,700 Oe) at most.

As a result of the presents inventors' earnest studies for solving the above problem it has been found that by forming a magnetite thin film on a substrate by sputtering method and then subjecting the magnetite thin film to sputtering treatment in an oxygen-rich atmosphere to transform the magnetite thin film into a maghemite thin film, the obtained magnetic recording medium is excellent in coercive force squareness S* and surface smoothness. The present invention has been attained based on the finding.

SUMMARY OF THE INVENTION

An object of the present invention is to provide a magnetic recording medium comprising a maghemite thin film, which is excellent in magnetic properties, especially coercive force squareness S*, and is more enhanced in surface smoothness.

Another object of the present invention is to provide an industrially and economically advantageous process for producing a magnetic recording medium comprising a maghemite thin film by sputtering method.

To accomplish the aims, in a first aspect of the present invention, there is provided a magnetic recording medium, comprising:

a substrate; and a maghemite thin film formed on the substrate, having a thickness of 7 to 50 nm, a center-line mean surface roughness (Ra) of 0.1 to 1.0 nm and a coercive force squareness S* value of not less than 0.50.

In a second aspect of the present invention, there is provided a magne recording medium, comprising:

a substrate, an underlayer rmed on the substrate, comprising oxides such as nickel oxide, magnesium oxide or cobalt oxide, chromium metal, or chromium alloy such as Cr-W alloy, Cr-V alloy, Cr-Ti alloy or Cr-Mo alloy; and a maghemite thin film formed on the substrate, having a thickness of 7 to 50 nm, a center-line mean surface roughness (Ra) of 0.1 to 1.0 nm and a coercive force squareness S* value of not less than 0.50.

In a third aspect of the present invention, there is provided a process for producing the magnetic recording medium according to the first invention, comprising:

forming a magnetite thin film on a substrate by sputtering method; and continuously subjecting the magnetite thin film to sputtering treatment in can oxygen-rich atmosphere in a sputtering chamber without taking out the thin film into an atmosphere, to transform the magnetite thin film into a maghemite thin film, In a fourth aspect of the present invention, there is provided a process for producing the magnetic recording medium according to the second invention, comprising:

forming an underlayer on the substrate, comprising oxides having a NaCl-type structure such as nickel oxide, magnesium oxide or cobalt oxide; chromium metal; or chromium alloy such as Cr-W alloy, Cr-V alloy, Cr-Ti alloy or Cr-Mo alloy;

forming a magnetite thin film on the underlayer by sputtering method; and continuously subjecting the magnetite thin film to sputtering treatment in oxygen-rich atmosphere in a sputtering chamber without taking out the thin film into atmosphere to transform the magnetite thin film into a maghemite thin film.

DETAILED DESCRIPTION OF THE INVENTION

Figure 1:
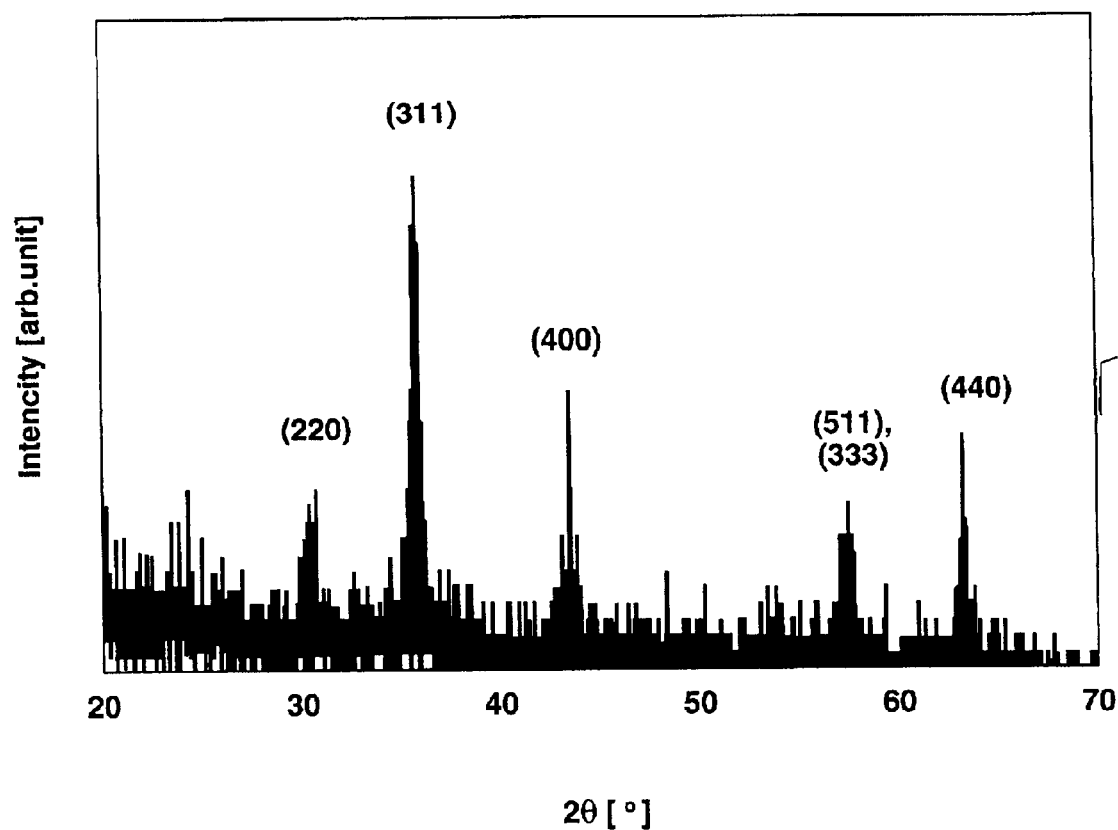
FIG. 1 is a view showing X-ray diffraction patterns of a maghemite thin film formed by the production process according to the present invention.

The present invention will be described in detail below.

First, the magnetic recording medium of the present invention is described.

The magnetic recording medium of the present invention comprises a substrate and a maghemite thin film formed on the substrate.

As the substrate used in the present invention, there may be exemplified plastic substrates made of polyethylene naphthalate (PEN), polyethylene terephthalate (PET), etc., glass substrates, aluminum substrates or the like. Among these substrates, the glass substrates are preferred.

In the magnetic recording medium of the present invention, an underlayer may be disposed between the substrate and the maghemite thin film. As the underlayer, there may be used thin films of oxides having a NaCl-type structure such as nickel oxide thin film magnesium oxide thin film and cobalt oxide thin film; chromium metal thin film and chromium alloy thin films made of Cr-W alloy, Cr-V alloy Cr-Ti alloy, Cr-Mo alloy or the like. Among these underlayers, the nickel oxide thin film, magnesium oxide thin film, chromium (Cr) metal thin film and Cr-Mo alloy thin film are preferred. In the case where the nickel oxide thin film is used as the underlayer, the maghemite thin film formed thereon is improved not only in magnetic properties, especially coercive force, but also in surface smoothness as aimed by the present invention. The thickness of the underlayer used in the present invention is usually 5 to 200 nm, preferably 5 to 100 nm. When the thickness of the underlayer is less than 5 nm, it may become difficult to have the more improved surface smoothness of the obtained maghemite thin film as aimed by the present invention. When the thickness of the underlayer is more than 200 nm, the maghemite thin film formed thereon may be deteriorated in surface smoothness.

The maghemite thin film may be oriented. The orientation of the maghemite thin film is controlled by the underlayer. In case of using the nickel oxide thin film as the underlayer, in which the plane (200) of the nickel oxide thin film is predominantly oriented in parallel with the surface of the substrate, the plane (400) of the maghemite thin film is predominantly oriented in parallel with the surface of the substrate, so that the obtained magnetic recording medium is useful as a perpendicular magnetic film.

In addition, in the case where the ratio of an X-ray diffraction spectrum peak intensity of the (111) plane to an X-ray diffraction spectrum peak intensity of the (200) plane is more than 0.5:1, the ratio of either of X-ray diffraction spectrum peak intensities of the (311), (222) or (220) planes to an X-ray diffraction spectrum peak intensity of the (400) plane becomes more than 0.5:1, so that the obtained magnetic recording medium is useful as a longitudinal magnetic film.

The maghemite thin film used in the present invention has a thickness of usually 7 to 50 nm, preferably 7 to 45 nm, more preferably 7 to 40 nm. When the thickness of the maghemite thin film is less than 7 nm, it is difficult to obtain a magnetic recording medium having a coercive force value of not less than 159 kA/m (2,000 Oe). When the thickness of the maghemite thin film is more-than 50 nm, it becomes difficult to uniformly magnetize the maghemite thin film up to a deep portion thereof, thereby failing to achieve good read and write characteristics.

Meanwhile, maghemite is generally represented by the general formula: $\gamma-Fe_2O_3$. However, the maghemite usable in present invention may contain $Fe^{2+}$ of in a small amount.

The maghemite thin film used in the present invention may contain a predetermined amount of cobalt therein for enhancing a coercive force thereof. The amount of cobalt contained in the maghemite thin film is usually not more than 20% by weight, preferably 1 to 10% by weight based on the weight of Fe. When the cobalt content is more than 20% by weight, it may be difficult to obtain a magnetic recording medium having an excellent stability independent of change in passage of time.

Meanwhile, the maghemite thin film used in the present invention may contain, if required, an ordinarily used element other than cobalt such as Mn, Ni, Cu, Ti, Zn, Cr, B or the like, at a molar ratio of the element to Fe of preferably about 0.005:1 to about 0.04:1, for improving various properties thereof. The addition of these elements facilitates the production of magnetic recording media having a high coercive force.

Among various parameters of the surface roughness of the maghemite thin film, the center line mean roughness (Ra) thereof is usually 0.1 to 1.0 nm, preferably 0.1 to 0.9 nm, more preferably 0.1 to 0.8 nm. When the center line mean roughness (Ra) of the maghemite thin film is more than 1.0 nm, it is difficult to obtain the aimed effect of the present invention.

The maghemite thin film used in the present invention has a coercive force squareness S* value (referred in Magnetic Charecterisation of Thin Film Recording Media, published in IEEE TRANSACTIONS ON MAGNETICS, Vol. 29, No. 1, Jan. 1, 1993, pages 286–289) of usually 0.50 to 0.90, preferably 0.55 to 0.90. When the coercive force squareness S* value is less than 0.5, the maghemite thin film is deteriorated in overwrite characteristics and, therefore, is inapplicable to magnetic recording media.

Among the parameters of the surface roughness of the maghemite thin film, the maximum height ($R_{max}$) thereof is preferably 1 to 12 nm more preferably 1 to 10 nm, still more preferably 1 to 9 nm. When the maximum height ($R_{max}$) is more than 12 nm, it may be difficult to obtain the aimed effect of the present invention.

In case where the thin film of the oxide having a NaCl-type structure is formed as the underlayer on the substrate or no underlayer is formed on-the-substrate, the magnetite thin film as a precursor film has an electrical resistance value of preferably 1 to 500 k $\Omega$, and the magnetic recording medium of the present invention has an electrical resistance value of preferably 50 to 3,000 M $\Omega$, more preferably 50 to 2,500 M $\Omega$, still more preferably 50 to 2,000 M $\Omega$.

In addition, in case where the chromium metal thin film or the chromium alloy thin film is formed as the underlayer on the substrate, the magnetite thin film as a precursor film has an electrical resistance value of preferably 0.1 to 50 k $\Omega$, and the magnetic recording medium of the present invention has an electrical resistance value of preferably 0.1 to 10 M $\Omega$.

When the electrical resistance value of the magnetic recording medium is less than 0.1 M $\Omega$ or 50 M $\Omega$, there may be expected that magnetite still remains in the maghemite thin film, resulting in adversely affecting properties thereof.

The magnetic recording medium of the present invention has a saturation magnetization value (value of magnetization when applying a magnetic field of 1,590 kA/m (20 kOe) thereto) of usually 29 to 53 $Wb/m^3$ (230 to 420 $emu/cm^3$), preferably 30 to 53 $Wb/m^3$ (240 to 420 $emu/cm^3$), more preferably 31 to 53 $Wb/m^3$ (250 to 420 $emu/cm^3$); and a coercive force value of usually not less than 159 kA/m (2,000 Oe), preferably 199 to 1,194 kA/m (2,500 to 15,000 Oe).

Next, the process for producing the magnetic recording medium according to the present invention is described.

The magnetic recording medium of the present invention can be produced by forming a magnetite thin film on a substrate by sputtering method, and then continuously conduct the sputtering treatment onto the magnetite thin film in an oxygen-rich atmosphere in a sputtering chamber without taking out the thin film into atmosphere to transform the magnetite thin film into a maghemite thin film.

The sputtering apparatus used in the present invention is not particularly restricted. Any known sputtering apparatus generally used for conducting the sputtering method, may be used in the present invention.

In the present invention, the formation of the magnetite thin film and the subsequent sputtering treatment in an oxygen-rich atmosphere may be continuously conducted in the same sputtering chamber. Alternatively, by using two separate sputtering chambers disposed adjacent to each other, the formation of the magnetite thin film may be conducted in one chamber, and then the sputtering treatment in an oxygen-rich atmosphere is continuously conducted in another chamber without taking out the thin film into outside atmosphere. In the consideration of industrial productivity, it is preferred that the formation of the magnetite thin film and the subsequent sputtering treatment in an oxygen-rich atmosphere are separately conducted in the two different chambers.

Meanwhile, it is preferred that the Fe target or Fe alloy target used for the formation of the magnetite thin film is a separate one from that used in an oxygen-rich atmosphere for transforming the magnetite thin film into the maghemite thin film.

The magnetite thin film can be produced using a known sputtering apparatus including a target, a holder for retaining the substrate, a vacuum chamber and the like, for example, "C-3102" (manufactured by NICHIDEN ANERUBA CO., LTD.) and "SH-250H-T06" (manufactured by NIHON SHINKU GIJUTSU CO., LTD.) by the following method.

That is, a mixed gas composed of oxygen and rare gas is introduced to the sputtering chamber in which the Fe target or Fe alloy target is disposed, and the magnetite thin film is deposited on the substrate while controlling the flow rate of oxygen (CCM) contained in the mixed gas and the magnetite deposition velocity (nm/sec.).

The ratio of the oxygen flow rate (CCM) to the magnetite deposition velocity (nm/sec.) varies depending upon various conditions used for obtaining the magnetite thin film by oxidizing the Fe target or Fe alloy target, for example, kind and structure of apparatus used, deposition rate, total gas pressure, substrate temperature, surface area of sputtering target or the like.

In the present invention, the "oxygen-rich atmosphere" used for obtaining the maghemite thin film, means the region having such an oxygen partial pressure under which the surface of the Fe target or Fe alloy target is oxidized so that the film-formation velocity of magnetite is remarkably decreased. In this condition, the cathode current is considerably increased and the voltage is considerably decreased as compared to the condition where the surface of the Fe target or Fe alloy target remains unoxidized. In the present invention, it is considered that $Fe^{3+}$ is sputtered from the target by conducting the sputtering in such an oxygen-rich atmosphere in which the formation rate of the magnetite film decreases remarkably.

More specifically, in the sputtering film-formation apparatus used in the present invention, the oxygen-rich atmosphere means such a region satisfying the condition represented by the formula:

$$F_{O2}/R \geq 12$$

wherein $F_{O2}$ is an oxygen flow rate (CCM) used for the oxidation treatment; and R is a magnetite deposition rate (nm/sec.).

For example, in the case of R=2.0 (nm/sec.), the oxygen flow rate ($F_{O2}$) capable of oxidizing the target is not less than 24 (CCM). Also, in the case of R=1.0 (nm/sec.), the oxygen flow rate ($F_{O2}$) capable of oxidizing the target is not less than 12 (CCM).

In the present invention, the sputtering treatment of the magnetite thin film in an oxygen-rich atmosphere is conducted at a substrate temperature of usually 30 to 250° C., preferably 80 to 200° C. When the substrate temperature is out of the above-specified range, it may be difficult to sufficiently obtain the aimed effect of the present invention.

In the present invention, the reaction time required for the sputtering treatment in an oxygen-rich atmosphere is usually 1 to 30 seconds, preferably 1 to 10 seconds. When the reaction time is less than one second, it may be difficult to sufficiently obtain the aimed effect of the present invention. When the reaction time is more than 30 seconds, the obtained maghemite thin film may be deteriorated in magnetic properties.

Further, in the case of the magnetic recording medium having the underlayer, the underlayer is preliminarily formed on the substrate, and then the magnetite thin film is formed on the underlayer and then transformed into the maghemite thin film, as described above.

The point of the present invention lies in such a fact that all treatments including the formation of the magnetite thin film by sputtering method and the subsequent transformation of the magnetite thin film into the maghemite thin film, are conducted within vacuum apparatus without taking out the thin film into atmosphere.

Hitherto, in order to obtain a maghemite thin film, it has been required to take out a magnetite thin film formed in a vacuum apparatus into atmosphere, and then subject the thus obtained magnetite thin film to oxidation treatment under atmosphere. On the contrary, in the present invention, all these treatments can be continuously conducted in the vacuum apparatus. Therefore, the thin film is free from contamination or pollution, resulting in simple operations.

Further, in the case of the conventional heating treatment conducted in atmosphere, the whole treatment including heating and cooling steps requires several hours. On the contrary, in the present invention, since such a prolonged heating and cooling steps are not required, the time required for producing the maghemite thin film can be considerably shortened.

In addition, the process of the present invention can be conducted at a relatively low temperature as compared to the conventional methods. Therefore, plastic substrates such as PET substrate, PEN substrate or the like which are not applicable to the conventional methods, can be used in the present invention, and the obtained maghemite thin film is prevented from being deteriorated in magnetic properties due to undesired migration from the substrate and/or underlayer.

The reason why the magnetite thin film is transform into the maghemite thin film by the process of the present invention, is considered as follows. That is, when $Fe^{3+}$ is sputtered against the magnetite thin film, the sputtered $Fe^{3+}$ acts as an oxidization on the magnetite thin film, thereby promoting such an oxidation reaction of $Fe^{2+} \rightarrow Fe^{3+} + e^-$. In addition, the sputtered $Fe^{3+}$ which acts as an oxidizing agent, is reduced into $Fe^{2+}$ which is then subjected again to the above oxidation reaction. Therefore, the chain-like reaction proceeds continuously, so that the whole magnetite thin film can be transformed into the maghemite thin film.

FIG. 1 shows X-ray diffraction patterns of a maghemite thin film formed on a nickel oxide thin film by the production process of the present invention. As shown in FIG. 1, all of diffraction peaks were attributed to maghemite, i.e., no diffraction peaks of magnetite were observed. Therefore, it is clearly confirmed that the magnetite thin film can be completely transformed into the maghemite thin film by the process of the present invention. Further, there were observed no peaks of substances other than maghemite such as nickel oxide or the like. Therefore, it is also confirmed that the maghemite layer is free from migration of substrate and/or nickel oxide or the like thereinto.

The reason why the magnetic recording medium of the present invention can exhibit an excellent surface smoothness, is considered as follows. That is, since the magnetite thin film is treated at a low temperature, the growth of crystal grains thereof is inhibited, so that the magnetite can be uniformly transformed into maghemite. It is further considered that due to the uniform transformation of magnetite into maghemite, the obtained maghemite thin film can be prevented from being deteriorated in magnetic properties.

The magnetic recording medium of the present invention is excellent in surface smoothness and magnetic properties and, therefore, is suitable as those for high-density recording.

Also, in the process for producing a magnetic recording medium according to the present invention, all treatments can be conducted at a low temperature within a vacuum apparatus without taking out the thin film into outside atmosphere. Therefore, the present invention can provide a suitable process for the production of magnetic recording media having excellent properties.

EXAMPLES

The present invention is described in more detail by Examples and Comparative Examples, but the Examples are only illustrative and, therefore, not intended to limit the scope of the present invention.

Various properties were measured by the following methods.

(1) The thickness of a magnetic layer composed of the magnetite thin film or maghemite thin film was determined as follows.

That is, before forming the thin film, a line was drawn with a felt pen on a substrate. Then, after depositing the thin film on the substrate, the deposited film and the underlying line were simultaneously removed using an organic solvent. The thus formed step height was measured by a tracer-type surface roughness tester (manufactured by Veeco Co., Ltd.). The thickness of the respective thin films was calculated from the measured value.

(2) The oxidation of magnetite thin film into maghemite thin film was confirmed by measuring the change in surface resistivity of the thin film as an index of oxidation thereof by the following method.

That is, the surface electrical resistivity of the magnetite thin film is in the range of 0.001 to 0.5 MΩ, whereas the surface resistivity of the maghemite thin film is raised from 1 to 3,000 MΩ. The surface resistivity was measured by an Insulation tester DM-1527 (manufactured by Sanwa Denki Keiki Co., Ltd.) by setting the distance between two probes to 10 mm.

(3) The X-ray diffraction patterns of the respective thin films are expressed by values measured by "X-Ray Diffractometer RINT 2000" (manufactured by RIGAKU DENKI CO., LTD.).

The measuring conditions of the X-ray diffraction patterns were as follow:

Cu-Kα; tube voltage: 40 kV; tube current: 200 mA; sampling width of vertical type goniometer: 0.020°; light-emitting (divergent) slit: 0.2 mm; scattering slit: OPEN; light-receiving slit: 5.0 mm; incident angle (θ): 0.2°; diffraction angle (2θ): 10.000 to 70.00°.

(4) The surface roughness (center line mean roughness ($R_a$) and maximum height ($R_{max}$)) of the magnetite thin film or maghemite thin film was measured using an atomic force microscope (manufactured by Digital Instruments (D.I.)), and evaluated with respect to a 5 μm-square area of each film.

(5) The magnetic properties such as coercive force and saturation magnetization of the magnetic recording medium, are expressed by values measured by "Vibrating Sample Magnetometer VSM" (manufactured by TOEI KOGYO CO., LTD.). The magnetic properties of the magnetic recording medium were measured by applying a maximum magnetic field of 1,590 kA/m (20 kOe) thereto.

Example 1

<Production of magnetic recording medium>

By using an in-line disc sputtering apparatus "C-3120" (manufactured by NICHIDEN ANERUBA CO., LTD.) and setting a distance between a glass substrate and a metal (Ni) target to 85 mm, the metal target was sputtered at ordinary temperature in an oxygen and argon atmosphere having an oxygen flow rate of 10 CCM, an oxygen partial pressure of 0.015 Pa and a total pressure of 0.094 Pa, thereby forming a nickel oxide thin film having a thickness of 100 nm at a deposition velocity of 1 nm/sec. on the glass substrate. Then, a metal alloy (Fe+3 wt % Co) target was sputtered at a temperature of 150° C. in an oxygen and argon atmosphere having an oxygen flow rate of 22 CCM, an oxygen partial pressure of 0.03 Pa and a total pressure of 0.38 Pa, thereby forming a Co-containing magnetite thin film having a thickness of 40 nm at a deposition velocity of 2 nm/sec. on the nickel oxide thin film.

The thus obtained Co-containing magnetite thin film was continuously treated in the same apparatus by sputtering a metal alloy (Fe+3 wt % Co) target at a temperature of 150° C. in an oxygen and argon atmosphere having an oxygen flow rate of 74 CCM, an oxygen partial pressure of 0.12 Pa and a total pressure of 0.40 Pa, thereby transforming the Co-containing magnetite thin film into a Co-containing maghemite thin film.

The thus obtained Co-containing maghemite thin film had a thickness of 40 nm, a surface roughness represented by a center line mean roughness ($R_a$) of 0.8 nm and a maximum height ($R_{max}$) of 9 nm, a coercive force value of 259 kA/m (3,250 Oe), and a coercive force squareness S* value of 0.62.

Examples 2 to 8 and Comparative Examples 1 to 2

The same procedure as defined in Example 1 was conducted except that amount of cobalt, oxygen flow rate and film thickness used upon the formation of cobalt-containing magnetite thin film, and substrate temperature used upon transformation into maghemite, were changed variously, thereby obtaining magnetic recording media.

Meanwhile, in Example 2, after the magnetite thin film was directly formed on the glass substrate, the magnetic recording medium was produced by the same method as defined in Example 1. In Comparative Example 1, after the magnetite thin film was formed by the same method as defined in Example 2, the oxidation treatment was conducted at a temperature of 320° C. in atmosphere, thereby obtaining the magnetic recording medium. In Comparative Example 2, after the magnetite thin film was formed by the same method as defined in Example 1, the oxidation treatment was conducted at a temperature of 320° C. in atmosphere, thereby obtaining the magnetic recording medium.

The production conditions are shown in Table 1, and various properties of the obtained magnetic recording media are shown in Table 2.

Comparative Example 3

The same procedure as defined in Example 3 was conducted except that after forming the magnetite thin film was continuously heat-treated in the vacuum apparatus without conducting the sputtering treatment, thereby obtaining the magnetic recording medium.

The production conditions are shown in Table 1, and various properties of the obtained magnetic recording medium are shown in Table 2.

Example 10

By using an in-line disk sputtering apparatus "C-3120" (manufactured by NICHIDEN ANERUBA CO., LTD.) and a MgO sintered target, the MgO sintered target was sputtered at ordinary temperature in an oxygen and argon atmosphere having an oxygen flow rate of 0 CCM and a total pressure of 0.37 Pa, thereby forming a MgO thin film having a thickness of 70 nm at a deposition velocity of 0.2 nm/sec. on the glass substrate.

The same procedure as defined in Example 1 was conducted, thereby obtaining perpendicular magnetic recording medium, in which the plane (200) of the MgO thin film is predominantly oriented in parallel with the surface of the substrate, the plane (400) of the maghemite thin film is predominantly oriented in parallel with the surface of the substrate.

Examples 11 and 12

By using an in-line disk sputtering apparatus "C-3120" (manufactured by NICHIDEN ANERUBA CO., LTD.) and the Cr metal target (Example 11) and the Cr-Mo alloy target (Example 12) was sputtered at ordinary temperature in an oxygen and argon atmosphere having an oxygen flow rate of 0 CCM, an oxygen partial pressure of 0 Pa and a total pressure of 0.37 Pa, thereby forming a Cr metals thin film (Example 11) and Cr-Mo alloy thin film (Example 12) having a thickness of 50 nm at a deposition velocity of 3 nm/sec. on the glass substrate.

The same procedure as defined in Example 1 was conducted, thereby obtaining a magnetic recording medium.

TABLE 1

| Examples and Comparative Examples | Kind | Oxygen flow rate (CCM) | Film-formation velocity (nm/sec.) | Substrate temperature (° C.) |
|---|---|---|---|---|
| | | Production conditions of magnetic recording medium Production conditions of underlayer | | |
| Example 2 | — | — | — | — |
| Example 3 | NiO | 10 | 1 | 20 |
| Example 4 | NiO | 10 | 1 | 20 |
| Example 5 | NiO | 10 | 1 | 20 |
| Example 6 | NiO | 10 | 1 | 20 |
| Example 7 | NiO | 10 | 1 | 20 |
| Example 8 | NiO | 10 | 1 | 20 |
| Example 9 | NiO | 10 | 1 | 20 |
| Example 10 | MgO | 0 | 0.2 | 20 |
| Example 11 | Cr | 0 | 3.3 | 20 |
| Example 12 | CrMo | 0 | 3.3 | 20 |
| Comparative Example 1 | — | — | — | — |
| Comparative Example 2 | NiO | 10 | 1 | 20 |
| Comparative Example 3 | NiO | 10 | 1 | 20 |

| Examples and Comparative Examples | Oxygen flow rate (CCM) | Film-formation velocity (nm/sec.) | Substrate temperature (° C.) |
|---|---|---|---|
| | Production conditions of magnetic recording medium Production conditions of magnetite thin film | | |
| Example 2 | 22 | 2 | 150 |
| Example 3 | 22 | 2 | 150 |
| Example 4 | 22 | 2 | 150 |
| Example 5 | 20 | 2 | 150 |
| Example 6 | 22 | 2 | 150 |
| Example 7 | 22 | 2 | 150 |
| Example 8 | 22 | 2 | 150 |
| Example 9 | 22 | 2 | 150 |
| Example 10 | 22 | 2 | 150 |
| Example 11 | 22 | 2 | 150 |
| Example 12 | 22 | 2 | 150 |
| Comparative Example 1 | 22 | 2 | 150 |
| Comparative Example 2 | 22 | 2 | 150 |
| Comparative Example 3 | 22 | 2 | 150 |

TABLE 1-continued

| Examples and Comparative Examples | Oxygen flow rate (CCM) | Substrate temperature (° C.) | Time (sec.) |
|---|---|---|---|
| | Production conditions of magnetic recording medium Transformation into maghemite | | |
| Example 2 | 74 | 110 | 2 |
| Example 3 | 74 | 110 | 2 |
| Example 4 | 74 | 130 | 2 |
| Example 5 | 74 | 130 | 2 |
| Example 6 | 74 | 150 | 2 |
| Example 7 | 74 | 200 | 2 |
| Example 8 | 74 | 150 | 2 |
| Example 9 | 74 | 150 | 2 |
| Example 10 | 74 | 150 | 2 |
| Example 11 | 74 | 150 | 2 |
| Example 12 | 74 | 150 | 2 |
| Comparative Example 1 | Heat-treated at 320° C. for one hour in atmosphere | | |
| Comparative Example 2 | Heat-treated at 320° C. for one hour in atmosphere | | |
| Comparative Example 3 | Only heated at 200° C. | | |

TABLE 2

| Examples and Comparative Examples | Thickness of underlayer (nm) | Composition | Cobalt content (wt. %) |
|---|---|---|---|
| | Properties of magnetic recording medium | | |
| Example 2 | — | Co-$\gamma$Fe$_2$O$_3$ | 3 |
| Example 3 | 100 | Co-$\gamma$Fe$_2$O$_3$ | 3 |
| Example 4 | 100 | Co-$\gamma$Fe$_2$O$_3$ | 3 |
| Example 5 | 100 | Co-$\gamma$Fe$_2$O$_3$ | 3 |
| Example 6 | 100 | Co-$\gamma$Fe$_2$O$_3$ | 3 |
| Example 7 | 100 | Co-$\gamma$Fe$_2$O$_3$ | 3 |
| Example 8 | 50 | Co-$\gamma$Fe$_2$O$_3$ | 8 |
| Example 9 | 100 | Co-$\gamma$Fe$_2$O$_3$ | 8 |
| Example 10 | 70 | Co-$\gamma$Fe$_2$O$_3$ | 8 |
| Example 11 | 50 | Co-$\gamma$Fe$_2$O$_3$ | 8 |
| Example 12 | 50 | Co-$\gamma$Fe$_2$O$_3$ | 3 |
| Comparative Example 1 | — | Co-$\gamma$Fe$_2$O$_3$ | 3 |
| Comparative Example 2 | 100 | Co-$\gamma$Fe$_2$O$_3$ | 3 |
| Comparative Example 3 | 100 | Co-$\gamma$Fe$_2$O$_3$ | 3 |

| Examples and Comparative Examples | Thickness of maghemite thin film (nm) | Magnetic properties Saturation magnetization Wb/m$^3$ | emu/m$^3$ |
|---|---|---|---|
| | Properties of magnetic recording medium | | |
| Example 2 | 25 | 50 | 395 |
| Example 3 | 16 | 49 | 390 |
| Example 4 | 18 | 50 | 400 |
| Example 5 | 25 | 40 | 320 |
| Example 6 | 40 | 31 | 250 |
| Example 7 | 40 | 31 | 250 |
| Example 8 | 18 | 41 | 331 |
| Example 9 | 25 | 34 | 274 |
| Example 10 | 28 | 30 | 239 |
| Example 11 | 28 | 40 | 319 |
| Example 12 | 18 | 36 | 290 |
| Comparative Example 1 | 25 | 41 | 326 |
| Comparative Example 2 | 40 | 45 | 360 |
| Comparative Example 3 | 40 | 54 | 430 |

TABLE 2-continued

| Examples and Comparative Examples | Properties of magnetic recording medium Magnetic properties | | Coercive force squareness (−) |
|---|---|---|---|
| | Coercive force | | |
| | kA/m | Oe | |
| Example 2 | 241.5 | 3,035 | 0.50 |
| Example 3 | 186.5 | 2,343 | 0.56 |
| Example 4 | 200.4 | 2,518 | 0.64 |
| Example 5 | 237.5 | 2,985 | 0.71 |
| Example 6 | 258.6 | 3,250 | 0.62 |
| Example 7 | 307.2 | 3,860 | 0.68 |
| Example 8 | 402.0 | 5,051 | 0.66 |
| Example 9 | 396.5 | 4,982 | 0.60 |
| Example 10 | 519.8 | 6,532 | 0.70 |
| Example 11 | 392.0 | 4,929 | 0.71 |
| Example 12 | 216.2 | 2,717 | 0.64 |
| Comparative Example 1 | 316.4 | 3,976 | 0.38 |
| Comparative Example 2 | 274.8 | 3,453 | 0.30 |
| Comparative Example 3 | 112.8 | 1,418 | 0.4 |

| Examples and Comparative Examples | Properties of magnetic recording medium | | |
|---|---|---|---|
| | Electrical resistance (MΩ) | Surface roughness | |
| | | $R_a$ (nm) | $R_{max}$ (nm) |
| Example 2 | 1,000 | 0.7 | 9 |
| Example 3 | 500 | 0.5 | 6 |
| Example 4 | 120 | 0.6 | 7 |
| Example 5 | 530 | 0.4 | 8 |
| Example 6 | 90 | 0.8 | 9 |
| Example 7 | 120 | 0.8 | 9 |
| Example 8 | 1,900 | 0.5 | 5 |
| Example 9 | 1,500 | 0.5 | 7 |
| Example 10 | 1,800 | 0.9 | 9 |
| Example 11 | 1 | 0.9 | 9 |
| Example 12 | 1 | 0.9 | 9 |
| Comparative Example 1 | 1,000 | 1.5 | 17 |
| Comparative Example 2 | 1,700 | 1.2 | 12 |
| Reference Example 1 | 8 | 1.0 | 11 |

What is claimed is:

1. A magnetic recording medium, comprising:
   a substrate; and
   a maghemite thin film formed on the substrate, having a thickness of 7 to 50 nm, a surface roughness represented by a center line mean roughness Ra of 0.1 to 1.0 nm, a coercive force value of not less than 159 kA/m and a coercive force squareness S* value of not less than 0.50.

2. A magnetic recording medium according to claim 1, further comprising an underlayer formed between the substrate and the maghemite thin film, and comprising one selected from the group consisting of a thin film of an oxide having a NaCl-type structure, a chromium metal thin film and a chromium alloy thin film.

3. A magnetic recording medium according to claim 2, wherein the underlayer is one selected from the group consisting of a nickel oxide thin film, a magnesium oxide thin film, a chromium metal thin film and a Cr-Mo alloy thin film.

4. A magnetic recording medium according to claim 2, wherein the underlayer has a thickness of 5 to 200 nm.

5. A magnetic recording medium according to claim 1, wherein the maghemite thin film contains cobalt in an amount of not more than 20% by weight.

6. A magnetic recording medium according to claim 1, wherein the maghemite thin film has a surface roughness represented by a maximum height $R_{max}$ of 1 to 12 nm.

7. A magnetic recording medium according to claim 1, which has an electrical resistance value of 1 to 3,000 MΩ, a saturation magnetization value of 29 to 53 Wb/m³ when measured by applying a magnetic field of 1,590 kA/m thereto.

* * * * *